United States Patent
Larrieu et al.

(10) Patent No.: US 8,131,095 B2
(45) Date of Patent: Mar. 6, 2012

(54) PROCESS AND DEVICE FOR THE COMPRESSION OF PORTIONS OF IMAGES

(75) Inventors: Jerome Larrieu, Hasparren (FR); Alexandre Delattre, Paris (FR)

(73) Assignee: Actimagine, Paris (FR)

( * ) Notice: Subject to any disclaimer, the term of this patent is extended or adjusted under 35 U.S.C. 154(b) by 750 days.

(21) Appl. No.: 12/222,410

(22) Filed: Aug. 8, 2008

(65) Prior Publication Data

US 2008/0304761 A1    Dec. 11, 2008

Related U.S. Application Data

(63) Continuation-in-part of application No. 10/769,884, filed on Feb. 3, 2004, now abandoned.

(30) Foreign Application Priority Data

Feb. 3, 2003  (FR) ...................................... 03 01226

(51) Int. Cl.
  G06K 9/36     (2006.01)
  G06K 9/46     (2006.01)
(52) U.S. Cl. ....................................................... 382/239
(58) Field of Classification Search .................. 382/164, 382/173, 218–220, 232, 239, 248, 251, 305; 375/240.08, 240.1, 240.16, 240.24, 240.25, 375/E7.243
See application file for complete search history.

(56) References Cited

U.S. PATENT DOCUMENTS

| | | | |
|---|---|---|---|
| 5,241,395 A | 8/1993 | Chen | |
| 5,682,204 A | 10/1997 | Uz et al. | |
| 5,724,451 A | 3/1998 | Shin et al. | |
| 5,740,283 A * | 4/1998 | Meeker | 382/248 |
| 6,072,830 A | 6/2000 | Proctor et al. | |
| 6,097,832 A | 8/2000 | Guillotel et al. | |
| 6,130,912 A | 10/2000 | Chang et al. | |
| 6,584,226 B1 | 6/2003 | Chaddha et al. | |
| 6,724,820 B2 * | 4/2004 | Ramanzin | 375/240.12 |
| 6,757,429 B2 | 6/2004 | Hu | |
| 6,842,483 B1 * | 1/2005 | Au et al. | 375/240.16 |

(Continued)

OTHER PUBLICATIONS

Nieweglowski, J. et al., A Novel Video Coding Scheme Based on Temporal Prediction Using Digital Image Warping, *Consumer Electronics*, IEEE Transactions, Vo. 39, pp. 141-150, 1993.

(Continued)

*Primary Examiner* — Amir Alavi
(74) *Attorney, Agent, or Firm* — Lowe Hauptman Ham & Berner, LLP

(57) ABSTRACT

The process of compression of a block of a size L.times.H of a sequence of images comprises, in a repetitive manner, for said block: a search step, in one of the images of the sequence of images, for the zone L.times.H pixels the most similar to said block; a step of determining whether the resemblance between said zone and said block responds to predetermined criteria; if said resemblance responds to said criteria, a step of storing the motion vector which indicates the distance between the block and the most similar zone found; if said resemblance does not respond to said criteria, and if the block does not have a predetermined minimum size, a step of cutting out said block into sub-blocks and a supplemental repetition, for each of said sub-blocks, and if said resemblance does not respond to said criteria, and if the block has a predetermined minimum size, a step of storing the block in the course of which the block is compressed without reference to a reference image.

14 Claims, 5 Drawing Sheets

U.S. PATENT DOCUMENTS

| | | | |
|---|---|---|---|
| 7,929,609 B2* | 4/2011 | Riemens et al. | 375/240.16 |
| 2004/0156552 A1* | 8/2004 | Larrieu et al. | 382/239 |
| 2005/0213655 A1* | 9/2005 | Thoreau et al. | 375/240.1 |
| 2007/0047660 A1* | 3/2007 | Mitani et al. | 375/240.25 |
| 2008/0159402 A1* | 7/2008 | Chen et al. | 375/240.16 |
| 2008/0304761 A1* | 12/2008 | Larrieu et al. | 382/239 |
| 2009/0290643 A1* | 11/2009 | Yang | 375/240.16 |
| 2010/0111183 A1* | 5/2010 | Jeon et al. | 375/240.16 |

OTHER PUBLICATIONS

Kureeren, R. et al., Synchronization-Predictive Coding for Video Compression: The SP Frames Design for JVT/H:261, *Proceedings 2002 International Conference on Image Processing*, ICIP 2002 Rochester & New York, NY, vol. 2 of 3, Sep. 22, 2002, pp. 497-500.

Liu, J. et al., Multilevel Fractal Block Coding in Video Compression, *DSP The Enabling Technology for Communications, Conference Proceedings*, Mar. 9, 1993, pp. 6401-6409.

Nicholas, H. et al., Temporal Redundancy Reduction Using a Motion Model Hierarchy and Tracking for Image Sequence Coding, *SPIE Visual Communications and Image Processing*, Vo. 2094, Nov. 8, 1993, pp. 1548-1557.

Sawada, K. et al., Interframe/Fractal Hybrid Coding for Interlaced Video Sequences, *Circuits and Systems*, 1998, IEEE APCCAS 1998. The 1998 IEEE Asia-Pacific Conference on Chiangmai, Thailand Nov. 24-27, 1998, Piscataway, NJ, USA, IEEE, US, Nov. 24, 1998, pp. 599-602.

Cubiss, C. et al., Variable Block Size Motion Compensated Conditional Replenishment Image Coder, *Proceedings of the Picture Coding Symposium (PCS)*. Lausanne, Switzerland, Mar. 17-19, 1993, p. 136-A, XP000346453.

\* cited by examiner

PROCESS AND DEVICE FOR THE COMPRESSION OF PORTIONS OF IMAGES

RELATED APPLICATIONS

The present application is a continuation-in-part of U.S. patent application Ser. No. 10/769,884, filed Feb. 3, 2004, which is based on, and claims priority from, FR Application Number 0301226, filed Feb. 3, 2003, the disclosures of which are hereby incorporated by reference herein in its entirety.

FIELD OF THE INVENTION

The present invention relates to a process and a device for the compression of portions of images.

It is applicable in particular to the compression of sequences of images, for example video, for their transmission on a computer network, for example the Internet, or for storage on a digital data support.

This process and this device can be integrated into any system allowing the compression and then decompression of any part of an image on any hardware platform.

This includes in particular the distribution of video film or animated films on computers, consoles or portable or home video games, personal digital assistant, mobile phones, home DVD readers.

BACKGROUND OF THE INVENTION

The known standards for video compression, such as MPEG (Motion Picture Expert Group), used two groups 100 and 110 of steps described in FIG. 1 to compress the images of a video stream into non intra images, which is to say images which are encoded with reference to other images of the video stream:

The motion estimation 100 which consists in encoding each image from elements present in other images of the video stream (often the preceding image, the last intra image or the next intra image). The steps carried out are as follows:

step 101: cutting out the image and encoding it in blocks of a fixed size L.times.H pixels (often 16.times.16);

step 102: for each block of the image, searching in a preceding image (for example) of the floating zone of L.times.H pixels that is most similar to the block;

step 103: storage of the motion vector which indicates the motion (in spatial coordinates) between the block and the most similar zone located;

step 105: computation of the residue, which is to say the difference between the block and the most similar zone found.

motion compensation 110 which consists in compressing the residue. The steps carried out are as follows:

step 111: compression of the residue, most often thanks to a mathematical function, such as DCT (discrete cosine transform);

step 112: storage of the compressed residue and step 113: return to step 102 to encode the following block.

The decompression of the video then takes place in the following manner:

step 121: decompression of one or several intra images (images encoded without reference to the other images of the video stream);

group of steps 130: reconstitution of the non intra images by carrying out, for each block:

step 131: localization, thanks to the motion vector, of the most similar zone of another image of the video stream;

step 132: decompression of the residue, and step 133: adding the residue to the most similar zone to obtain the final block.

The conventional algorithms for encoding the residue (step 111) achieve suitable compression ratios only under the condition of encoding the values of the pixel in the format "Luminance Chrominance" (YUV). For a decompression on a hardware whose pixel format is "Red Green Blue" (RGB), step 133 must thus comprise moreover a color space conversion of YUV to RGB.

These known standards of video compression are very poorly adapted to the display of videos on less powerful platforms, such as portable game consoles or mobile phones.

The present invention seeks to overcome this drawback. To this end, the present invention provides, according to a first aspect, a process for the compression of a block of a size L.times.H of a sequence of images, characterized in that it comprises, in a repeating manner, for said block:

a search step, in one of the images of the sequence of images, of the zone of L.times.H pixels most similar to said block;

a step of determination whether the resemblance between said zone and said block responds to predetermined criteria;

if said resemblance responds to said criteria, a step of storage of the motion vector which indicates the distance between the block and the most similar zone found;

if said resemblance does not respond to said criteria, and if the block does not have a predetermined minimum size, a step of cutting out said block into sub-blocks and a supplemental repetition, for each of said sub-blocks, and if said resemblance does not respond to said criteria, and if the block has a predetermined minimum size, a step of storage of the block in the course of which the block is compressed without reference to a reference image.

It is noted that the size L.times.H is generally 16.times.16 pixels and that the predetermined minimum size is preferably 1.times.1 pixel or 2.times.2 pixels, which allows numerous repetitions. Moreover, when the resemblance does not respond to the predetermined criteria and the block has a predetermined minimum size, it is not the residue which is stored but the block itself.

Thanks to these arrangements, the present invention makes possible the compression and decompression (and hence the display) of image sequences:

of a quality equivalent to the conventional coders-decoders ("codecs"), on hardware platforms not having a sufficient machine power for conventional decompression, or even on powerful hardware platforms, but as to which it is desired to save a part of the power for another use, with a high compression ratio.

The process provided by the inventors allows to improve considerably the efficiency of the step of motion estimation, whereby rendering useless the step of motion compensation, which is the step that is most costly during decompression.

It will be noted that by eliminating the step of motion compensation, the present invention also eliminates the step of color space conversion, necessary for certain hardwares with the conventional algorithms. As to these hardwares, their speed of decompression is thus further improved relative to the state of the art.

According to particular characteristics:

in the course of the search step, there is conjointly determined a transformation of a zone which supplies the transformed zone that is most similar to said block, in the course of the determination step, it is determined whether the resemblance between said transformed zone and said block responds to predetermined criteria, and in the course of the vector storage step, if said zone after said transformation is the one that bears the most resemblance, the data representative of said transformation are stored.

Thanks to these arrangements, the compression ratio is increased.

According to particular characteristics, in the course of the storage step of the block of minimal size, the block is compressed without reference to a reference image.

Thanks to these arrangements, the compression ratio and the quality of compression are increased.

According to particular characteristics, in the course of the search step, there are searched among a plurality of images of the sequence of images, the zone of L.times.H pixels the most similar to said block and in the course of the vector storage step, the data representative of the image which comprise said zone are stored.

Thanks to these arrangements, the choice between the candidate zones is greater, which allows to increase the compression ratio.

According to particular characteristics, in the course of the search step, search is conducted only in the preceding image of the sequence of images, for the zone of L.times.H pixels that is the most similar to said block.

Thanks to these arrangements, the quantity of compression is increased because it is not necessary to store data representative of the image which comprises said zone.

According to particular characteristics, in the course of the step of cutting out, said block is cut in two sub-blocks of the same dimensions.

Thanks to these arrangements, the number of sub-blocks to be treated is reduced, which increases the speed of compression.

According to particular characteristics, in the course of each cutting out step, the block or the sub-block is cut out, on the one hand, vertically and, on the other hand, horizontally and, in the course of a selection step, there is selected the cutout which optimizes the overall resemblance of the sub-blocks generated by each of said cutting out steps, with zones of said images of the image sequence.

Thanks to these arrangements, the quality of compression is improved.

According to particular characteristics, the predetermined criteria depend on the dimensions of the block in question.

The present invention provides, according to a second aspect, a device for compression of a block of a size L.times.H of a sequence of images, characterized in that it comprises a processing means adapted to control in a repeating manner for said block:

a search means which searches in one of the images in the sequence of images, for the zone L.times.H pixels that is most similar to said block, a determination means which determines whether the resemblance between said zone and said block responds to predetermined criteria, if said resemblance responds to said criteria, a storage means which stores the motion vector which indicates the distance between the block and the zone that has been found to be the most similar;

if said resemblance does not respond to said criteria, and if the block has no minimum predetermined size, a cutout means which cuts out said block into sub-blocks, a supplemental repetition being carried out for each of said sub-blocks and if said resemblance does not respond to said criteria, and if the block has a predetermined minimal size, a storage means which compresses the block without reference to a reference image and stores the compressed block.

The present invention seeks, according to a third aspect, to provide a process for decompression of an image block, characterized in that it comprises, in a repeating manner:

a step of reading information representative of the block;

a step of determination whether said block is encoded in the form of several sub-blocks;

if said block is not encoded, under the form of several sub-blocks, a step of determination whether the block has a predetermined minimum size;

if said block is not encoded in the form of several sub-blocks and does not have a predetermined minimal size, a step of decompression of said block by reading of a motion vector and simple copying of the block of the same dimensions corresponding to said motion vector, in a reference image, if said block is not encoded in the form of several sub-blocks and has a predetermined minimum size, a step of decompression of said block according to a decompression method which does not make reference to a reference image, and if said block is encoded in the form of several sub-blocks, a return to the steps of determination for each of said sub-blocks.

The present invention seeks, according to a fourth aspect, a device for decompression of an image block, characterized in that it comprises a processing means (410) adapted to control in a repeating manner:

a reading means which reads information representative of said block;

a determination means which determines whether said block is encoded under the form of several sub-blocks;

if said block is not encoded in the form of several sub-blocks, a determination means which determines whether the block has a predetermined minimum size;

if said block is not encoded in the form of several sub-blocks and does not have a predetermined minimum size, a decompression means which decompresses said block by reading of a motion vector and simply copies the block of the same dimensions corresponding to said motion vector, in a reference image, if said block is not encoded in the form of several sub-blocks and has a predetermined minimum size, a decompression means which decompresses said block according to a decompression method that does not make reference to a reference image, and if said block is encoded in the form of several sub-blocks, a new repetition for each of said sub-blocks.

The advantages, objects and characteristics of the processes and of the device contemplated by the second, third and fourth aspect of the present invention being similar to those of the decompression process as briefly pointed out above, they are not repeated here.

Other advantages, objects and characteristics of the present invention will become apparent from the description which follows, given with respect to the accompanying drawings, in which:

DETAILED DESCRIPTION OF FIGS. 2-5

Figure 1:
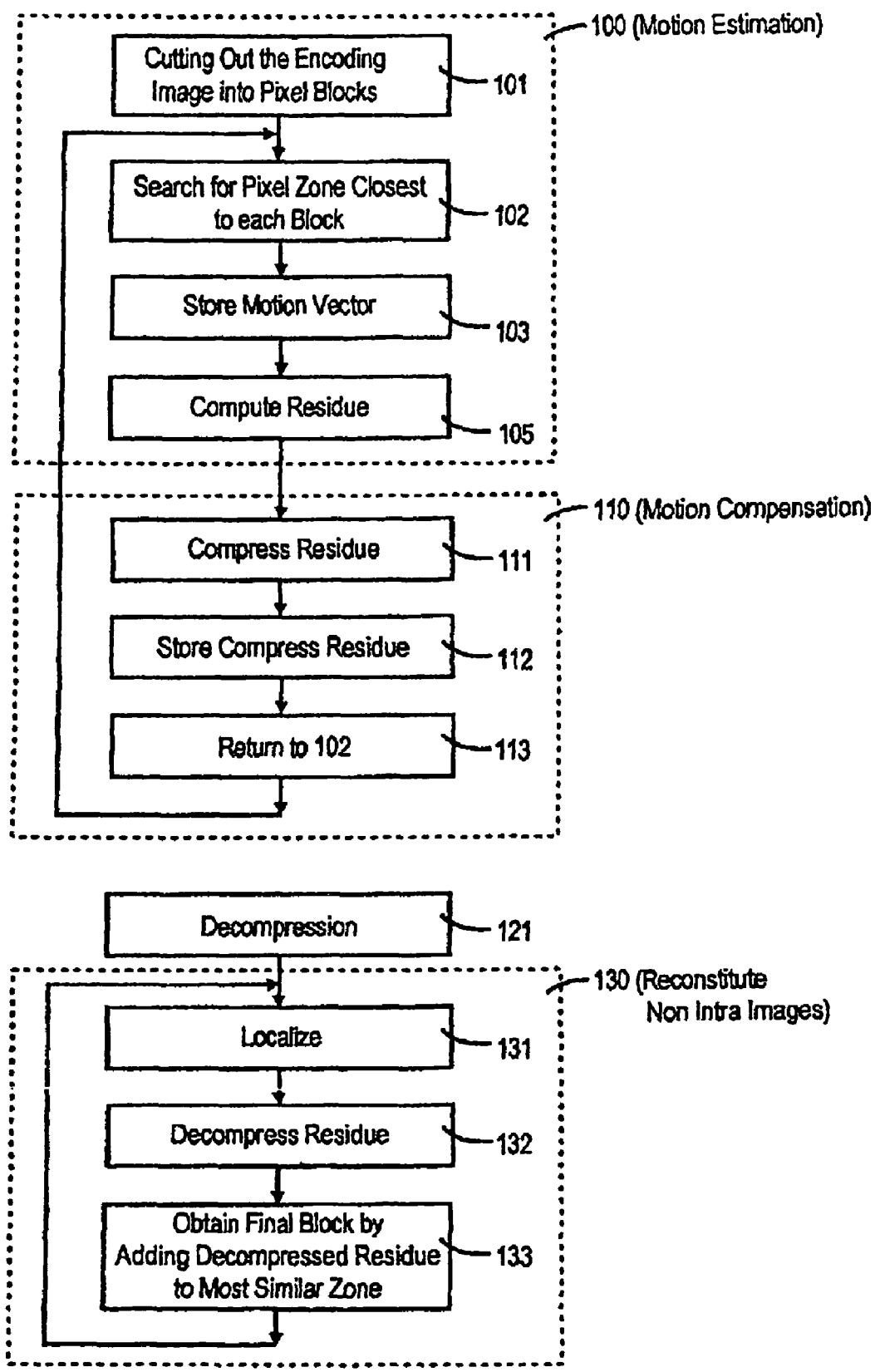
FIG. 1 is a logical diagram of a process according to the prior art set forth in the Background Art portion of this document.
Figure 2A:
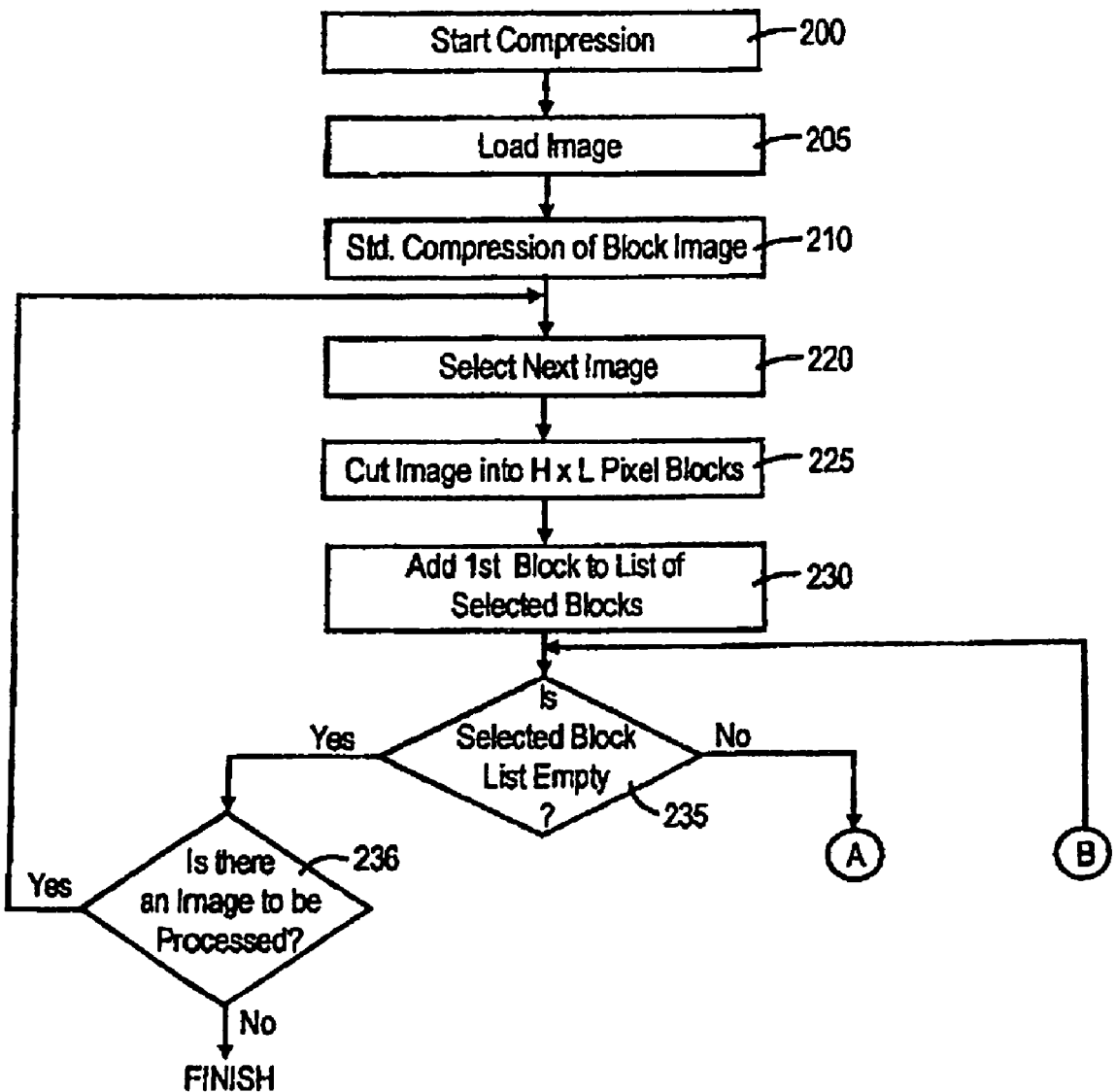
FIG. 2 shows, in the form of a logical diagram, a particular embodiment of the process of the present invention.
Figure 2B:
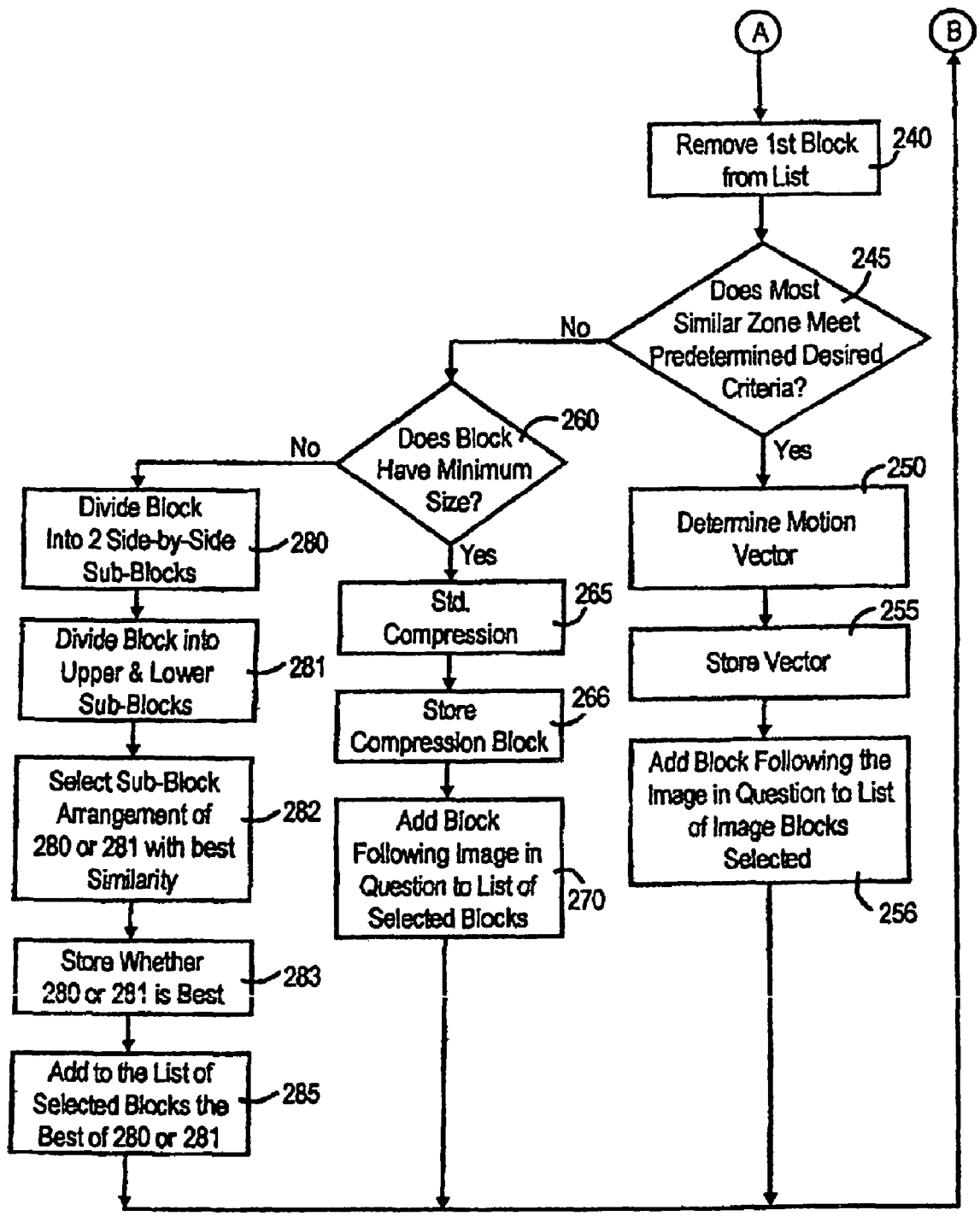

There will be seen, in FIG. 2, a step 200 of starting the compression device of sequences of images, then a step 205 for loading a first image of a sequence of images. A value H is preferably a power of 2 which divides the number of lines of the image in question (for example 16 for an image of 512 lines) and L is a power of 2 which divides the number of columns of the image in question (for example 16 for an image of 768 columns). The list of the selected blocks is empty.

In the course of a step 210, the first image is compressed in a known manner, for example without reference to a reference image (intra frame).

In the course of a step 220, the following image in the sequence of images is selected. In the course of a step 225, the image in question is cut out into blocks of H pixels in height and L pixels in width.

In the course of a step 230, the first image block in question is added to the list of selected blocks.

In the course of a step 235, it is determined whether the list of selected blocks is empty.

If it is, in the course of a step 236 it is determined whether there exists an image to be processed in the sequence of images. If there is, we return to step 220. If not, the processing is finished.

If the result of step 235 is negative, which is to say if there are blocks in the list of selected blocks, in the course of a step 240, the first block is removed from the list and it is compared to the floating blocks of the same size of the preceding images, called "zones" in what follows, and the zone of one of the preceding images the most similar to the block in question is detected as well as the transformation if desired (for example, horizontal and vertical symmetries, increase/decrease of luminance, rotation and combination of all these transformations) which most greatly increases the similarity between the predetermined zone and the block in question.

It will be noted that the criteria of possible comparison are very numerous to determine the best similarity between a block and a zone. By way of illustration, the MPEG standard does not specify what method should be used to compare 2 blocks. Each person skilled in the art selects his own solution. The two functions that are the most used are "Mean Square Difference" or "MSD" and "Mean Absolute Difference" or "MAD".

Among the possible criteria for the comparison we can cite the difference pixel to pixel, usually called residue, compared to a threshold. This criterion is easy to compute. An alternative is to compute a metric of the residue such as the SAD (Sum of the Absolute value of Differences): for the current block and the predicted block to be compared to a threshold. Another interesting alternative is to focus on the bit rate, which results from the division of the block and the prediction, and the distortion measured by the PSNR (Peak to peak Signal Noise Ratio) resulting from the prediction. These two values could be compared to two different thresholds or they can be combined linearly to get a value to be compared to one threshold. This alternative focuses on the efficiency of the coding regarding the bandwidth and the image quality.

Alternatively a more sophisticated way to take the decision to divide the block could be used. In this alternative, the block is analysed in a first step, not divided, by an estimation of the cost in term of bit rate and distortion as defined above, with a prediction using blocks of preceding images. In a second step, we make an analysis of the block with an intra prediction using an intra frame predictor working by interpolation of pixels with the three neighbours blocks (above, above-right and right). The cost is estimated in term of bit rate and distortion. This cost is compared with a threshold and if it is below the threshold a decision of division is taken, if no, then other types of intra frame predictors, for example direct copy, average of coefficients of the first row and the first column, linear combination of blocks and so on are used.

It will be noted that, theoretically, a process for compression could run through a large number of images to find the most similar zone, if desired after transformation, so as to find the block most similar or most closely resembling. In practice, the search is preferably limited by using one of the following strategies:

search in the preceding image,
search in the last intra image,
search in the last intra image and the next intra image.

In the course of a step 245, it is determined whether the most similar zone, if desired transformed, responds to predetermined resemblance criteria as to the block in question.

Preferably, the predetermined criteria depend on the size of the blocks in question (this size varies in the course of repetitions).

If the result of step 245 is positive, in the course of a step 250, the motion vector is determined which causes the spatial coordinates of the block in question to pass to the spatial coordinates of the most similar zone. In the course of a vector storage step 255, there are stored in the memory representative data:

of the fact that the data which will follow are relative to a block described by a motion vector,
of the transformation determined in the course of step 240,
of the image to which the most similar zone pertains, and
of the motion vector determined in the course of step 250.

It will be noted that the stored data are compressed by using standard compression techniques, with or without loss and, preferably standard compression techniques without loss.

As a modification, only the preceding image is considered and the data representative of the preceding image are not stored.

In the course of a step 256, the block following the image in question, if there is one, is added to the list of selected blocks, then one returns to step 235.

If the result of step 245 is negative, in the course of a step 260, it is determined whether the block has a predetermined minimum size (for example 1.times.1 or 1.times.2 pixels) by determining whether its height and width are equal to predetermined minimum values (for example 1 and 1, or 1 and 2).

If so, in the course of a step 265 the block of minimum size in question is compressed in a known manner, without reference to a reference image.

and, in the course of a storage step of block 266, there is stored in the memory:

information indicating that the data which will follow relate to a minimum block, and
the result of the compression.

Then, in the course of a step 270, the following block of the image in question is added, if there is one, to the list of selected blocks, then one returns to step 235.

If the result of step 260 is negative, which is to say that the block does not have a predetermined minimum size, in the course of a step 280, the block in question is divided into two equal sub-blocks along a vertical division into two right and left parts of equal sizes (see FIG. 3) and a step 240 is simulated to test each of the sub-blocks thus considered. In the course of a step 281, the block in question is divided into two equal sub-blocks along a horizontal division into two upper and lower portions of equal dimensions and a step 240 is simulated to test each one of the sub-blocks thus considered. Thus, the two types of divisions create sub-blocks for which the similarity has been determined, then, in the course of a step 282, the division (vertical or horizontal) is selected which gives the best overall similarity, which is to say which optimizes, according to predetermined criteria (for example the sum of the absolute values and the differences of the blocks with the best zones, if desired transformed), the overall resemblance of the generated sub-blocks, considering each of the vertical and horizontal cutouts, with zones of said images of the sequence of images.

As a modification, one chooses arbitrarily one of the divisions (for example, only the vertical division during the first step of division, then the horizontal division, then the vertical division . . . ). This renders compression more rapid, but at the price of a less good compression.

In the course of an information storage step of division 283, there is stored in the memory:

information indicating that the data which follow relate to a division of a block into two sub-blocks.

information which indicates whether the block has been divided vertically or horizontally.

In the course of a step 285, there is added to the list of selected blocks the two sub-blocks resulting from the vertical or horizontal division of the block, then one returns to step 235.

It will be noted that the recursive subdivision set forth above allows to isolate in an efficient manner the so-called blocks "of change", statistically less numerous, for which no zone of preceding image is sufficiently similar. The rest of the image, the greater portion, is encoded only by estimation of motion, allowing a high compression ratio and a high speed of decompression.

As a modification, steps 240 and 245 are reversed, step 245 in the course of which it is determined whether the most similar zone responds to predetermined resemblance criteria with the block in question, being carried out on the forward block of a possible transformation.

As a modification, step 240 is eliminated, step 245 in the course of which it is determined whether the most similar zone responds to predetermined resemblance criteria with the block in question being carried out on the block without transformation.

Figure 3:
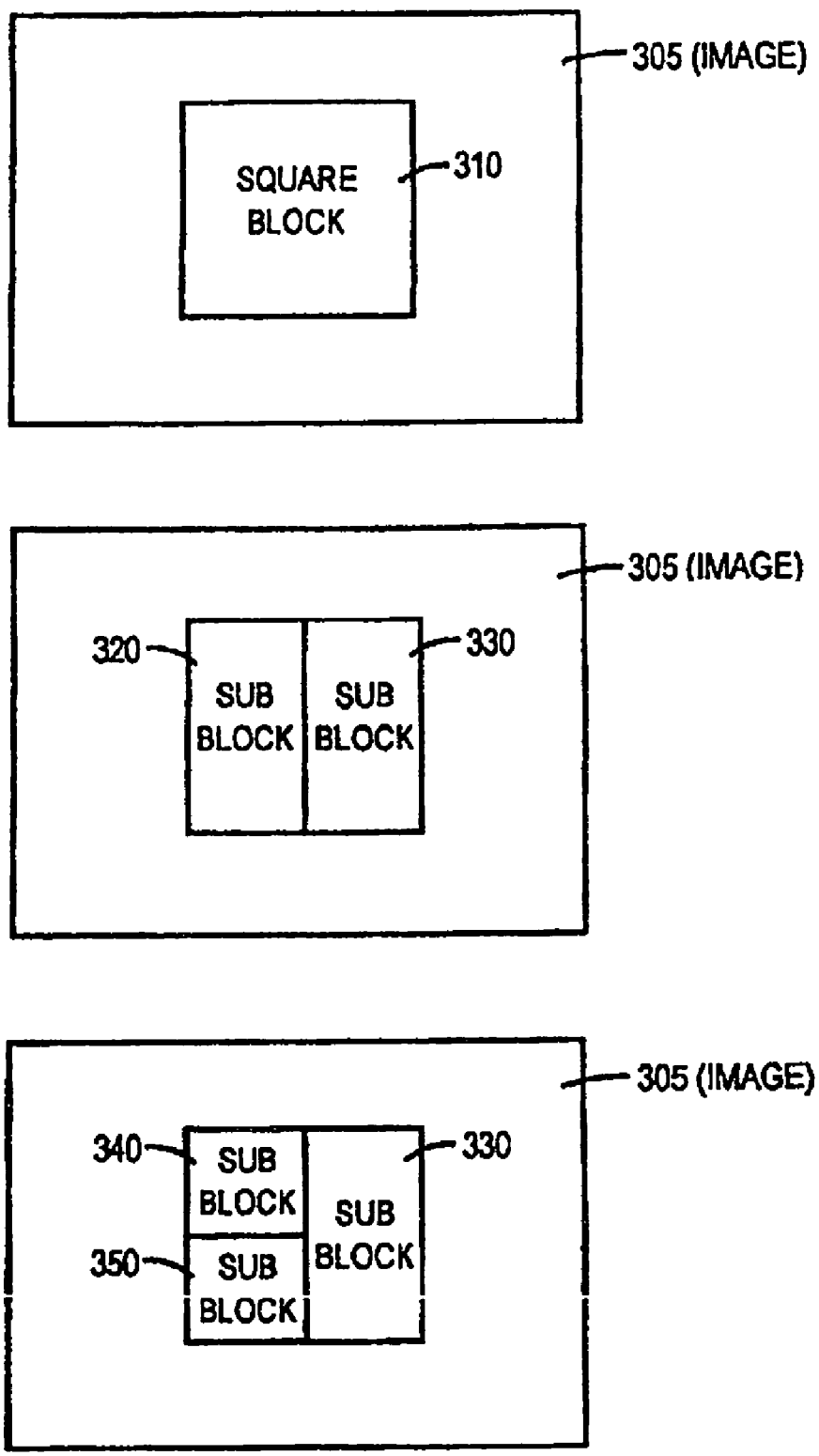
FIG. 3 shows image blocks in the course of processing.

There will be noted in FIG. 3 a square block 310, for example 32.times.32 pixels from a first cutout of an image 305 of blocks. If a step 280 is carried out on the block 310, in the course of this step 280, this block is divided into two sub-blocks 320 and 330, constituted for example of equal parts, right and left, of the block 310. The height of the sub-blocks 320 and 330 is 32 pixels and their width is 16 pixels. If a step 281 is carried out on the block 320, in the course of this step 281, this block is divided into two sub-blocks 340 and 350, for example constituted by equal portions, upper and lower, of the block 320. The height of the sub-blocks 340 and 350 is 8 pixels and their width is 8 pixels. If supplemental division steps are carried out, the successive divisions divide the sub-block into two equal parts.

Figure 4:
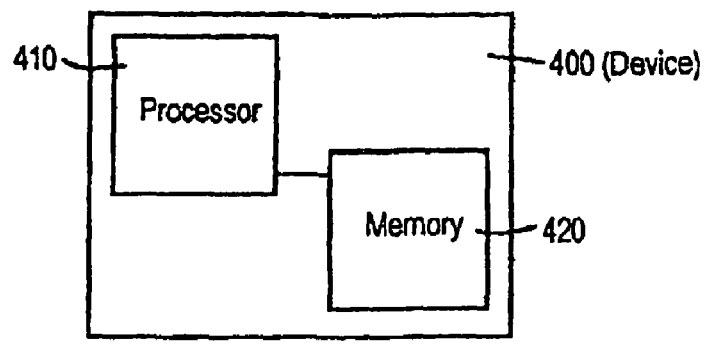
FIG. 4 shows, schematically, a particular embodiment of the device of the present invention.

There will be noted in FIG. 4 a device 400 comprising a processor 410 and a memory 420 adapted to store:

software instructions allowing the practice of the process of compression set forth above with respect to FIGS. 2 and 3 and/or of the process of decompression set forth below with respect to FIG. 5, data of images of a sequence of images, in non intra format and in compressed and/or decompressed format.

The processor 410 is adapted to carry out instructions of the software embedded in memory 420 and to transmit or receive the data of images that are compressed or not. For example, the processor is of the type Intel Pentium 4 (trademark).

The memory 420 can comprise at least one electronic component, for example an integrated circuit, a diskette, a hard disc and/or an optical disc, for example a compact disc, re-recordable or not.

The processor or processing means 410 comprises and is adapted to control, in a repeating manner for said block:

a search means which searches, in one of the images of the sequence of images, among the zone of L.times.H pixels, the one most similar to said block;

a determination means which determines whether the resemblance between said zone and said block responds to predetermined criteria;

if said resemblance responds to said criteria, a storage means which stores the motion vector which indicates the distance between the block and the most similar zone found;

if said resemblance does not respond to said criteria, and if, the block does not have a predetermined minimum size, a cutout means which cuts out said block into sub-blocks, a supplemental repetition being carried out for each of said sub-blocks and if said resemblance does not respond to said criteria, and if said block has a predetermined minimum size, a storage means which compresses the block without reference to a reference image and stores the compressed block.

The processor or processing means 410 comprises and is adapted to control, in a repetitive manner:

a reading means which reads the information representative of the block, a means for determining whether said block is encoded in the form of several sub-blocks;

if said block is not encoded in the form of several sub-blocks, a means for determining whether the block has a predetermined minimum size;

if said block is not encoded in the form of several sub-blocks and does not have a predetermined minimum size, a decompression means which reads a motion vector and copies the block of the same dimensions corresponding to said motion vector, in a reference image, if said block is not encoded in the form of several sub-blocks and has a predetermined minimum size, a decompression means which decompresses said block according to a decompression method that does not make reference to a reference image, and if said block is encoded in the form of several sub-blocks, a new repetition for each of said sub-blocks.

Figure 5:
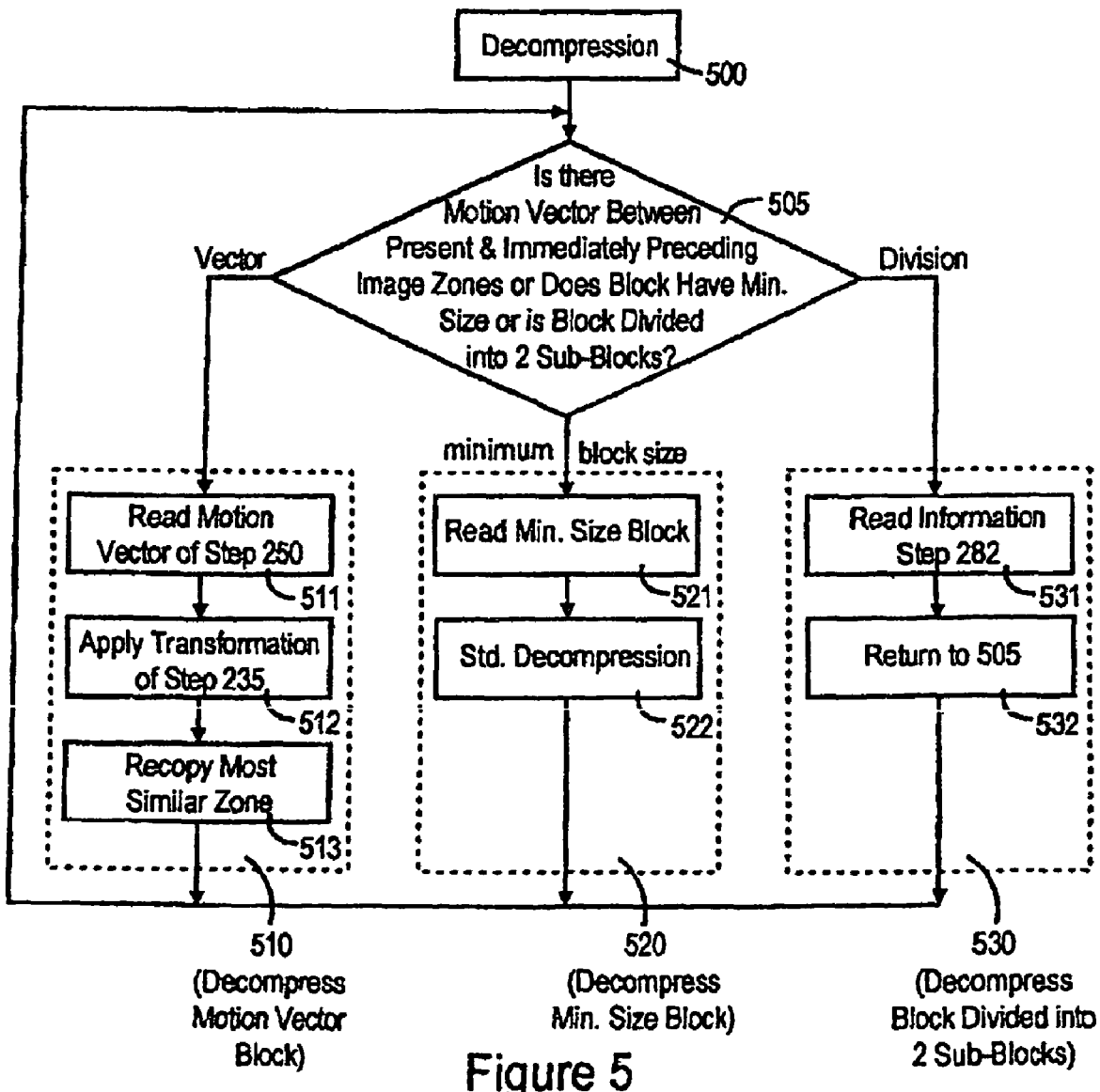
FIG. 5 shows, in the form of a logical diagram, a particular embodiment of a decompression of compressed images with the process of the present invention.

There will be noted, in FIG. 5, in the form of a logical diagram, a process for decompression of compressed images with the process according to the present invention.

In the course of a step 500, a decompression of one or several intra images is carried out (images encoded without reference to other images of the video stream).

Then, in the course of a step 505, the stored information is read concerning a block describing the type of data which will follow and the nature of the stored information representative of said block is determined. If it is a matter of a motion vector relative to a preceding image zone, the group of steps 510 is carried out. If it is a matter of a block of minimum size, the group of steps 520 is carried out. If it is a matter of a division of the block into two sub-blocks, the group of steps 530 is carried out.

It is to be noted that the size of the block in the course of decompression is continuously known: it is 16.times.16 pixels if step 530 has never been carried out, 8.times.16 or 16.times.8 pixels if a single step 530 has been carried out, etc.

the group of steps 510 allows to decompress a block described by a motion vector:

in the course of a step 511, the motion vector determined in the course of step 250 is read, and, thanks to said vector, the zone most similar to another image of the video stream is located.

in the course of a step 512, the predetermined transformation in the course of step 235 is applied if desired, and in the course of a step 513, the most similar zone (possibly transformed) is recopied to obtain the decompressed block;

the group of steps 520 allows to decompress a block of minimum size stored in the course of step 266:

in the course of a step 521, the compressed block is read, and in the course of a step 522, the read block is decompressed, with known decompression techniques, to obtain the decompressed block;

the group of steps 530 allows to decompress a block described by a division into two sub-blocks:

in the course of a step 531, the information is read which is determined in the course of step 282, which determines whether the block has been divided horizontally or vertically.

in the course of a step 532, one returns successively to step 505 for the two sub-blocks thus determined.

Following one or the other of steps 513 or 522, one returns to step 505 to read the stored information relating to the next block so far as long as remains a block or an image to be processed.

It will be noted that the process of cutting out the blocks into rectangular sub-blocks of multiple size of powers of 2 is but an example of embodiment. The invention is not limited to this example and can on the contrary carry out divisions into three sub-blocks or more, of arbitrary shapes.

The present invention is not limited to the compression of a block within an image of a sequence of images but extends to the codecs which use several methods (as a function of certain criteria) to encode the different blocks of a same image as well as to the codecs which use the process briefly set forth above to encode an image cut out into blocks of variable sizes and to codecs which use this process to encode only certain portions of each image.

The invention claimed is:

1. A method of compressing a block having a size L×H of a sequence of images, the method comprising using a processor to perform the following steps, in a repetitive manner, on said block:

searching, in one of the images of the sequence of images, for the zone of L×H pixels that is the most similar to said block;

determining whether the resemblance between said zone and said block responds to predetermined criteria;

if said resemblance responds to said criteria, storing a motion vector which indicates the distance between the block and the most similar zone found;

if said resemblance does not respond to said criteria, and if the block does not have a predetermined minimum size, cutting said block into sub-blocks and performing a supplemental repetition on each of said sub-blocks, and if said resemblance does not respond to said criteria, and if said block has a predetermined minimum size, storing the block so that while the block is being stored in the course of which the block is compressed without reference to a reference image:

wherein said criteria depends on the residue resulting from the prediction.

2. The method according to claim 1, wherein the searching step includes conjointly (a) determining a transformation and a zone that supplies the transformed zone which is the most similar to said block, determining, during the determining step (a), (b) whether the resemblance between said transformed zone and said block responds to predetermined criteria, and the storing step includes storing the vector data representative of said transformation, if said zone after said transformation is the zone most closely resembling the vector.

3. The method according to claim 2, wherein the searching step includes searching in a plurality of images of the sequence of images, for the zone of L×H pixels that is the most similar to said block, and the vector storing step includes storing data representative of the image which comprises said zone.

4. The method according to claim 2, wherein the searching step includes searching only in the preceding image of the sequence of images, for the zone of L×H pixels that is the most similar to said block.

5. The method according to claim 2, wherein the cutting out step includes cutting out said block into two sub-blocks having the same dimensions.

6. The method according to claim 1, wherein the searching step includes searching in a plurality of images of the sequence of images, for the zone of L×H pixels that is the most similar to said block, and the vector storing step includes storing data representative of the image which comprises said zone.

7. The method according to claim 6, wherein the searching step includes searching only in the preceding image of the sequence of images, for the zone of L×H pixels the most similar to said block.

8. The method according to claim 6, wherein the cutting out step includes cutting out said block into two sub-blocks having the same dimensions.

9. The method according to claim 1, further including searching only in the preceding image of the sequence of images during the search step for the zone of L×H pixels that is the most similar to said block.

10. The method according to claim 9, wherein the cutting out step includes cutting out said block into two sub-blocks having the same dimensions.

11. The method according to claim 1, further including cutting, during the cutting out step, said block into two sub-blocks having the same dimensions.

12. The method according to claim 11, wherein the cutting out step includes cutting out the block or the sub-block, on the one hand, vertically and, on the other hand, horizontally and, selecting, during the selecting step, including selecting the cutting out which optimizes the overall resemblance of the sub-blocks generated by each of said acts of cutting out, with zones of said images of the image sequence.

13. A computer arrangement for performing the method of claim 1.

14. A device for compressing a block having a size L×H, the block being a sequence of images, the device comprising:

a treatment arrangement for controlling, in a repetitive manner, for each block:

a search arrangement for searching, in one of the images of the sequence of images, for a zone of L×H pixels that most resembles said block;

a determining arrangement for determining whether the resemblance between said zone and said block meets predetermined criteria, all of which depend on the L×H dimensions of the block;

a storage arrangement for (a) storing a motion vector indicating the distance between the block and the most similar zone found in response to the determining arrangement determining the resemblance meets the criteria, and (b) compressing the block without reference to a reference image and storing the compressed block in response to the determining arrangement determining the resemblance does not meet said criteria and said block having at least a predetermined minimum size; and a cutting arrangement for cutting said block into sub blocks and for performing a supplemental repetition for each of said blocks, the cutting arrangement being arranged for performing the cutting and supplemental repetition operations in response to the resemblance not meeting said criteria and the block not having the predetermined minimum size.

* * * * *